a2

(12) United States Patent
Kohda et al.

(10) Patent No.: US 10,284,336 B2
(45) Date of Patent: *May 7, 2019

(54) ERROR DETECTION FOR WORMHOLE ROUTING

(71) Applicant: INTERNATIONAL BUSINESS MACHINES CORPORATION, Armonk, NY (US)

(72) Inventors: Yasuteru Kohda, Kawasaki (JP); Nobuyuki Ohba, Sendai (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/807,203

(22) Filed: Nov. 8, 2017

(65) Prior Publication Data

US 2018/0241507 A1    Aug. 23, 2018

Related U.S. Application Data

(63) Continuation of application No. 15/439,491, filed on Feb. 22, 2017.

(51) Int. Cl.
*H03M 13/00* (2006.01)
*H04L 1/00* (2006.01)
*H04L 12/721* (2013.01)

(52) U.S. Cl.
CPC .......... *H04L 1/0061* (2013.01); *H04L 1/0046* (2013.01); *H04L 45/40* (2013.01)

(58) Field of Classification Search
CPC ...... H04L 1/0061; H04L 1/0046; H04L 45/40
See application file for complete search history.

(56) References Cited

U.S. PATENT DOCUMENTS

| 2004/0098655 A1* | 5/2004 | Sharma | ............... | H03M 13/091 |
| | | | | 714/758 |
| 2004/0153952 A1* | 8/2004 | Sharma | ................. | H04L 1/0061 |
| | | | | 714/781 |

(Continued)

OTHER PUBLICATIONS

List of IBM Patents or Patent Applications Treated as Related dated Nov. 8, 2017, 2 pages.

(Continued)

*Primary Examiner* — Samir W Rizk
(74) *Attorney, Agent, or Firm* — Tutunjian & Bitetto, P.C.; Vazken Alexanian (57) ABSTRACT

A method is provided of detecting packet error during a transmission of a flit along a path from a source node through one or more intermediate nodes to a destination node. The method includes identifying a stalled node, from among the source and intermediate nodes, which prevents the transmission of the flit. The method includes generating, by a transmitter of the stalled node, a CRC for the flit and placing the CRC in an IDLE pattern of the flit. The method includes checking, by a receiver of an intermediate node subsequent to the stalled node, the CRC for the flit. The method includes sending, by a transmitter of the intermediate node, an error code to the destination node, and releasing the nodes from the intermediate node to and including the destination node, responsive to a detection, by the intermediate node, of an error in the CRC for the flit.

9 Claims, 10 Drawing Sheets

(56) References Cited

U.S. PATENT DOCUMENTS

| | | | |
|---|---|---|---|
| 2011/0243154 A1* | 10/2011 | Flynn | H04L 1/0072 370/471 |
| 2014/0189443 A1* | 7/2014 | Xu | G06F 11/1004 714/48 |
| 2015/0163170 A1 | 6/2015 | Birrittella | |
| 2016/0085619 A1 | 3/2016 | Iyer et al. | |

OTHER PUBLICATIONS

Wang et al., "Design of Low Power On-chip Router with Error-detection Re-transfer Scheme", IPSJ Sig Technical Report, Jan. 2011, pp. 1-6.

* cited by examiner

| 8B/10B | name | shorthand | 7-bit line code |
|---|---|---|---|
| K28.5 | idle | K | 0x16 |
| K28.1 | busy idle0 | Kb | 0x19 |
| K28.0 | idle1 | R | 0x25 |
| K23.7 | busy idle1 | Rb | 0x2a |
| K27.7 | start | S | encoded by TYPE byte |
| K29.7 | terminate | T | encoded by TYPE byte |
| K30.7 | error | E | 0x43 |
| K28.8 | violate | V | 0x4c |
| - | reserved0 | - | 0x70 |
| - | reserved1 | - | 0x7f |

ERROR DETECTION FOR WORMHOLE ROUTING

BACKGROUND

Technical Field

The present invention relates generally to error detection and, in particular, to error detection for wormhole routing.

Description of the Related Art

Wormhole routing (wormhole switching) is widely used for packet switching networks because of its low latency compared to store-and-forward routing. In wormhole routing, a packet is divided into flits, and transferred flit-by-flit in a pipelined manner.

However, wormhole routing is not without deficiencies. For example, the links along the routing path are occupied until the whole packet is transferred. Transfer error is detected only at the destination. Thus, if an error occurred during the transfer, then it is preferable to release all the links on the path as soon as possible in order to allow other packets to use them.

Accordingly, there is a need for an error detection mechanism for wormhole routing.

SUMMARY

According to an aspect of the present invention, a method is provided of detecting packet error during a transmission of a flit of a packet along a path from a source node through one or more intermediate nodes to a destination node. The method includes identifying a stalled node, from among the source node and the one or more intermediate nodes, which prevents the transmission of the flit. The method further includes generating, by a transmitter of the stalled node, a Cyclic Redundancy Code (CRC) for the flit and placing the CRC for the flit in an IDLE pattern inserted at an end of the flit. The method also includes checking, by a receiver of an intermediate node that is subsequent in the path to the stalled node from among the one or more intermediate nodes, the CRC for the flit. The method additionally includes sending, by a transmitter of the intermediate node, an error code to the destination node, and releasing the nodes from the intermediate node to and including the destination node, responsive to a detection, by the intermediate node, of an error in the CRC for the flit.

According to another aspect of the present invention, a system is provided for detecting packet error during a transmission of a flit of a packet along a path. The system includes a plurality of nodes that includes a source node, one or more intermediate nodes, and a destination node. The path is rom the source node through the one or more intermediate nodes to the destination node. Each of the plurality of nodes includes a respective receiver and a respective transmitter configured to identify a stalled node, from among the source node and the one or more intermediate nodes, which prevents the transmission of the flit. The transmitter of the stalled node is configured to generate a Cyclic Redundancy Code (CRC) for the flit and place the CRC for the flit in an IDLE pattern inserted at an end of the flit. The receiver of an intermediate node that is subsequent in the path to the stalled node from among the one or more intermediate nodes is configured to check the CRC for the flit. The transmitter of the intermediate node is configured to send an error code to the destination node, and the nodes from the intermediate node to and including the destination node are released, responsive to a detection, by the intermediate node, of an error in the CRC for the flit.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to error detection for wormhole routing.

The present invention provides a mechanism that quickly detects errors and allows the router to release the link.

In an embodiment, the present invention detects packet error at the flit level and releases the links as soon as the packet error is detected.

Advantageously, there is no performance impact. An IDLE pattern is replaced with (or supplemented by) a sub-CRC and sent over the link only when the network is stalled. If the transfer time of the additional sub-CRC is less than the transfer time of IDLE pattern, then the total transfer time is not increased. It is to be appreciated that the terms "IDLE pattern" and "IDLE code" are used interchangeably herein. Moreover, it is to be appreciated that the terms "CRC" and "sub-CRC" are used interchangeably herein, with the sub-CRC added by the present invention being constrained to being inserted in IDLE patterns.

In an embodiment, the present invention can be implemented using one or more hardware circuits.

Thus, the present invention provides a "CRC on the way" approach, where the sub-CRC is calculated and added while the packet is in transmission (that is, on the way to the destination). In an embodiment, the "CRC on the way" calculator can be shared with a standard CRC calculator.

While applicable to many conditions and scenarios, as readily appreciated by one of ordinary skill in the art given the teachings of the present invention provided herein, some exemplary conditions include, but are not limited to, the following: long packet; short flit; low channel quality (e.g., as indicated by parameters/metrics including, but not limited to, a poor Bit Error Rate (BER)); and heavy traffic. Regarding heavy traffic, the heavier the traffic, the more often the packet transfer is stalled. IDLE pattern insertion between flits occurs when a first flit is blocked after some network hopping. In such a condition, a quick release of the links that are conveying a packet with errors is achieved.

Figure 1:
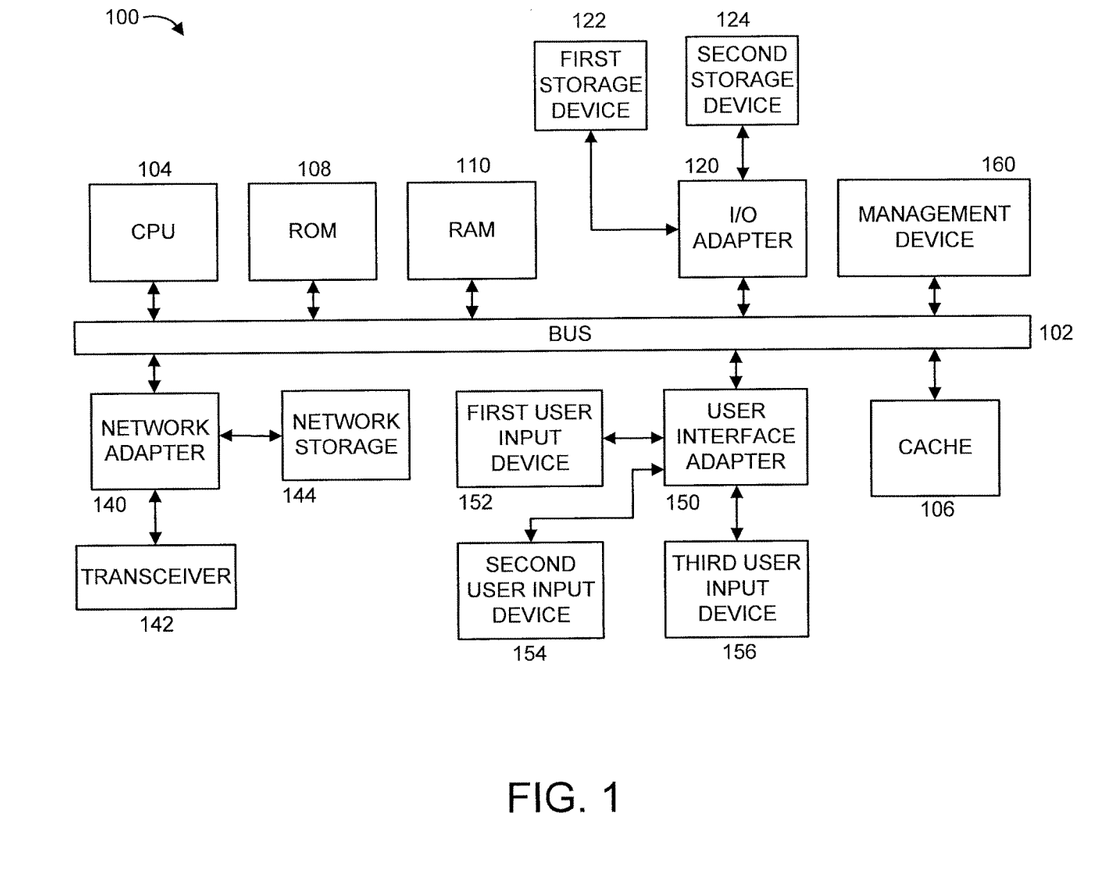
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
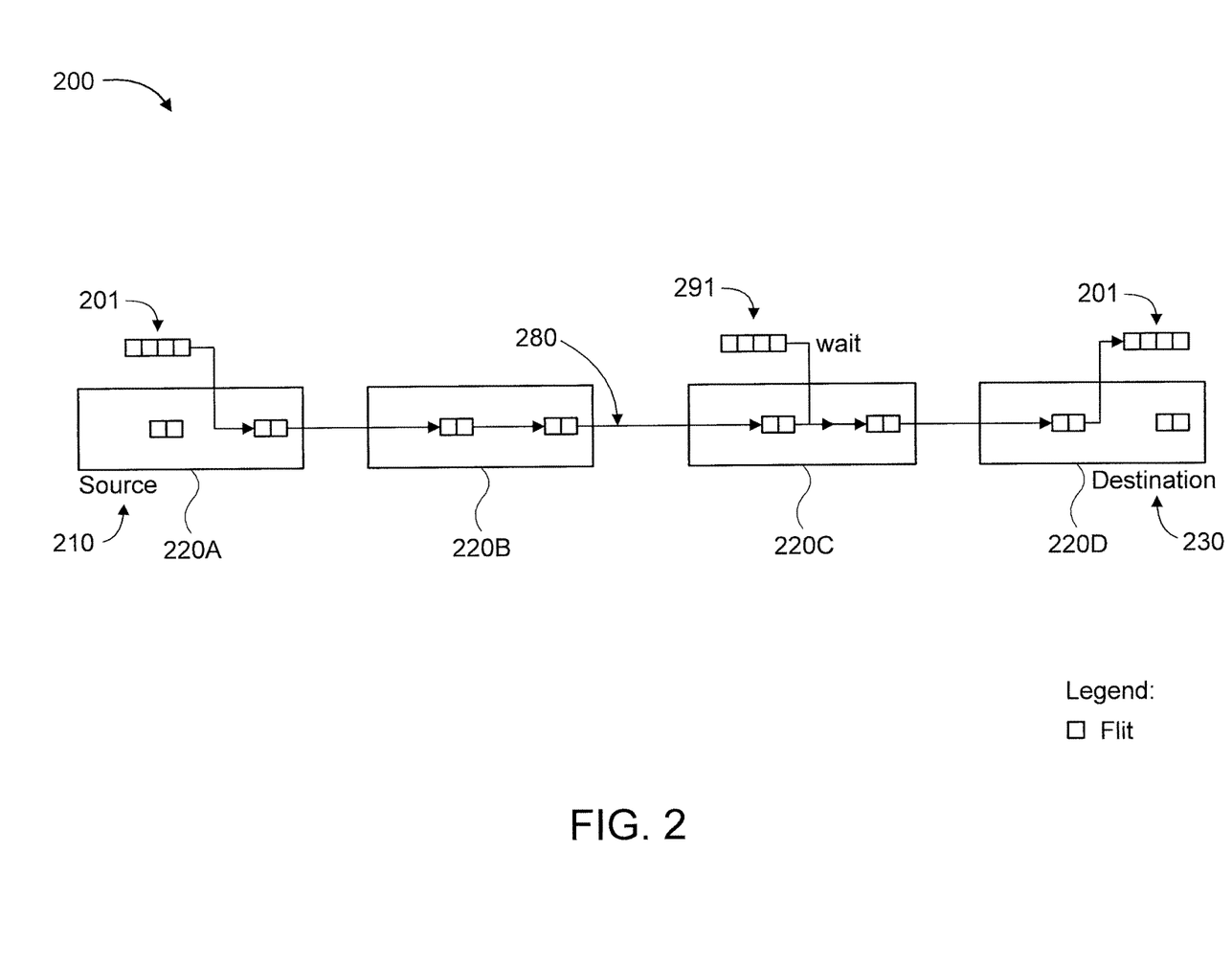
FIG. 2 shows an exemplary scenario to which the present invention can be applied, in accordance with an embodiment of the present invention.

FIG. 2 shows an exemplary scenario 200 to which the present invention can be applied, in accordance with an embodiment of the present invention.

The exemplary scenario 200 relates the transmission of a packet 201 from a source 210 to a destination 230 using links 220A, 220B, 220C, and 220D disposed there between. Link 220A corresponds to the source 210. Link 220D corresponds to the destination 230. Herein, the terms "link" and "network node" are used interchangeably.

When the link 220C is in use, another packet 291 must wait until the last flit of the packet 201 is transferred.

In the exemplary scenario 200, it is presumed that an error occurred at point 280, but is not detected at point 280 (between links 220B and 220C).

Rather, the error is detected only when the whole packet 201 arrives at the destination 230.

The other packet 291 cannot use the link 220 until the whole packet 201 is transferred to the destination.

It is to be noted that CRC checking is only performed at the destination 230.

Advantageously, the present invention detects errors on the way (from the source 210 to the destination 230) and releases network links as soon as possible.

Figure 3:
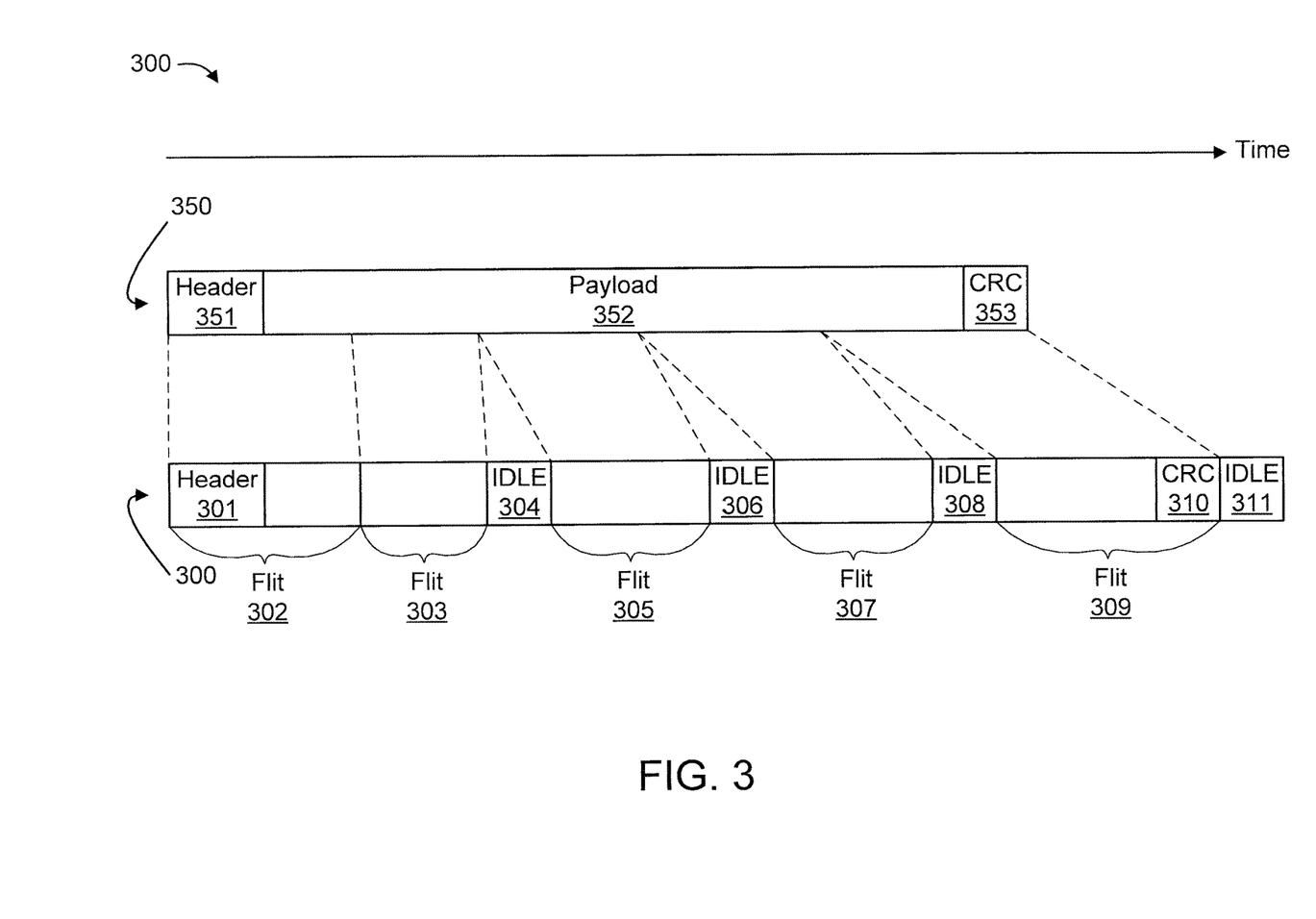
FIG. 3 shows exemplary data for wormhole routing on a physical link, in accordance with an embodiment of the present invention.

FIG. 3 shows exemplary data 300 for wormhole routing on a physical link, in accordance with an embodiment of the present invention.

The data 300 is obtained by breaking up a packet 350 into small pieces called FLITs (Flow control DigITs). The packet 350 includes a header portion 351, a payload portion 352, and a CRC portion 353.

The data 300 on the physical link (after breaking up the packet 350) includes the following: a header 301, a flit 302 (that includes header 301), a flit 303, an idle pattern 304, a flit 305, an idle pattern 306, flit 307, idle pattern 308, flit 309, a CRC portion 310, and an idle pattern 311.

A physical link/router inserts the IDLE pattern between the flits if the link transfer is stalled. In an embodiment, the IDLE pattern can be represented by a control word (k code). Of course, other representations of the IDLE pattern can also be used, while maintaining the spirit of the present invention.

The high-speed links can, for example, use line encoding (e.g., 8b/10b, 64b/66b, 64b/67b, 128b/130b, and so forth).

Figure 4:
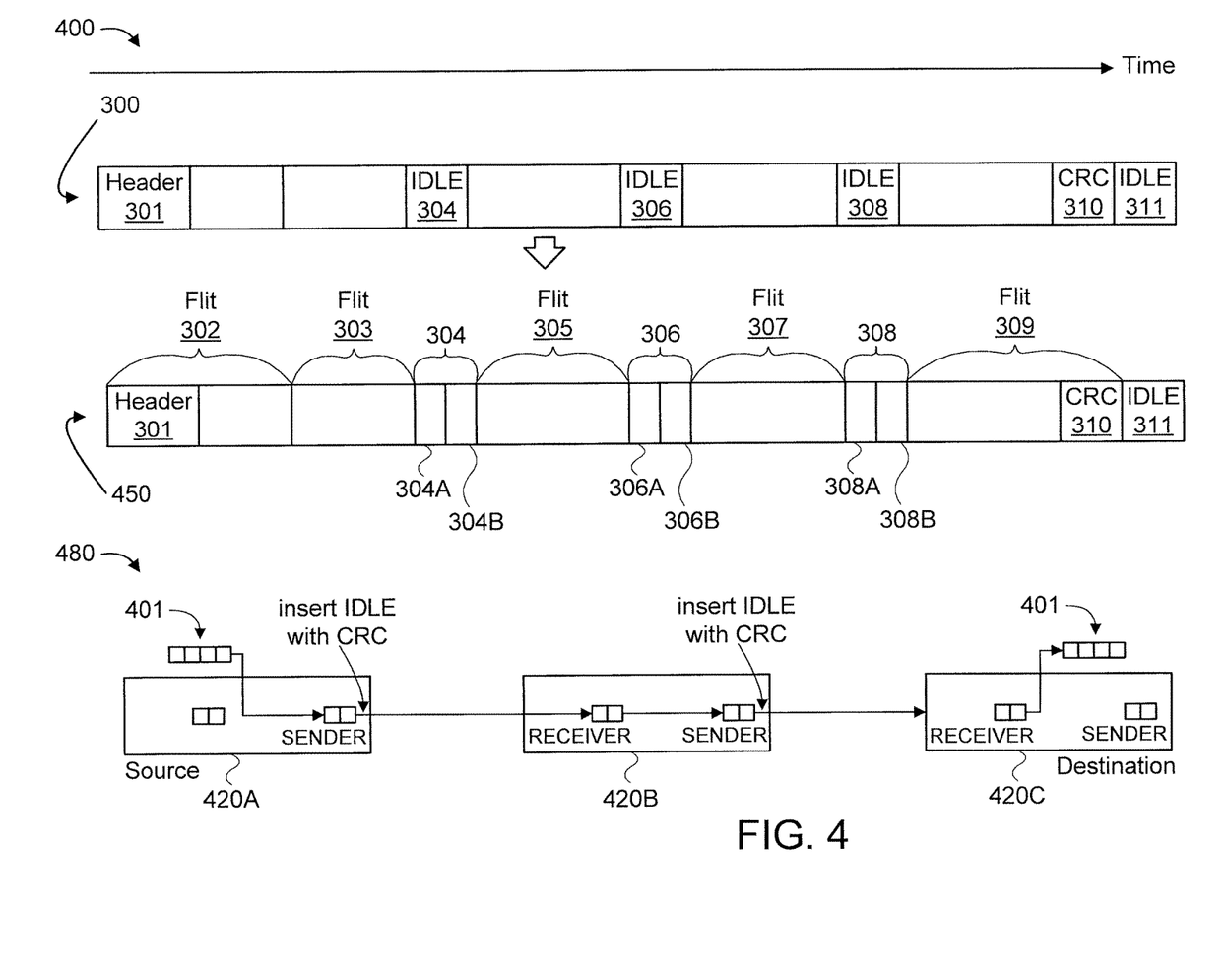
FIG. 4 shows an exemplary flit-level error detection using "CRC on the way", in accordance with an embodiment of the present invention.

FIG. 4 shows an exemplary flit-level error detection 400 using "CRC on the way", in accordance with an embodiment of the present invention.

The exemplary flit-level error detection 400 is shown with respect to the data 300 of FIG. 3 to show the relationship between the data 300 and the insertion of CRC into the IDLE patterns to form modified data 450.

Hence, as shown in FIG. 4, in each IDLE pattern 304, 306, and 308, respective CRC portions 304A, 306A, 308A, and 311A are inserted to form the modified data 450. Thus, IDLE pattern 304 includes CRC portion 304A and IDLE pattern portion 304B, IDLE pattern 306 includes CRC portion 306A and IDLE pattern portion 306B, and IDLE pattern 308 includes CRC portion 308A and IDLE pattern portion 308B.

The corresponding CRC calculation 480 for an original packet 401 is also shown in FIG. 4. The CRC calculation 480 is shown with respect to a source node 420A, a destination node 420C, and an intermediate network node 420B (hereinafter "network node" in short).

Referring to FIG. 4, when a node is stalled, the sender at the node (e.g., the sender at the source node 420A or the sender at the network node 420B) inserts sub-CRC code (e.g., CRC portion 304A and CRC portion 306A) in the first n-bytes of an IDLE pattern (e.g., idle patterns 304 and 306).

The sub-CRC code is calculated by using the data from the packet header (e.g., header 301) to the intermediate flit.

The receiver calculates sub-CRC, which can involve, for example, the receiver checking the CRC before each IDLE pattern.

When the receiver detects a CRC error, the receiver (i) sends an error code (e.g., defined in K codes) to the destination 420C and releases the link, and (ii) discards data from the sender (and sends the error to the source 420A, if needed).

The receiver discards the sub-CRC.

The sender calculates the sub-CRC and inserts it at an IDLE pattern.

It is to be noted that the CRC is calculated continuously from the source to the destination, with the IDLE and sub-CRC being excluded from the continuous calculation.

Figure 5:
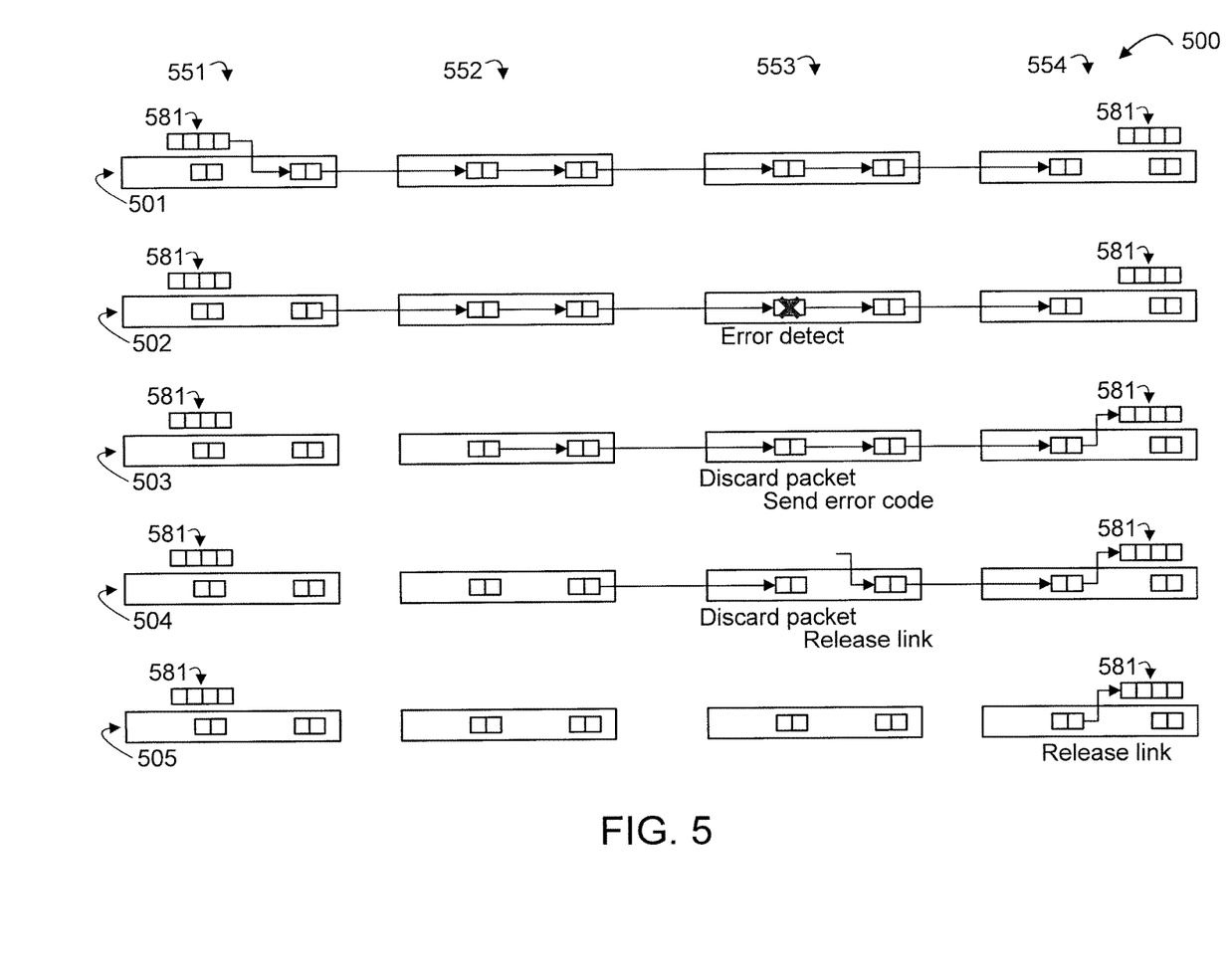
FIG. 5 shows an exemplary packet discarding in accordance with an embodiment of the present invention.

FIG. 5 shows an exemplary packet discarding 500, where the packet is discarded "on the way", in accordance with an embodiment of the present invention.

In FIG. 5, the packet discarding 500 involves a source node 551, a destination node 554, and intermediate network nodes (hereinafter "network nodes") 552 and 553. Each row shown in FIG. 5 corresponds to a respective one of steps 501 through 505 described hereinafter. Each column corresponds to a respective one of the nodes 551-554. In particular, the first column corresponds to the source node 551, the second column corresponds to the network node 552, the third column corresponds to the network node 553, and the fourth column corresponds to the destination node 554.

At step 501, commence transmission of a packet 581 from a source node 551 to a destination node 554 through intermediate network nodes 552 and 553.

At step 502, detect an error during the transmission of the packet 581 (e.g., at network node 553.

At step 503, discard the packet 581 and send an error code.

At step 504, release the link at network node 553.

At step 505, release the link at destination node 554.

Figure 6:
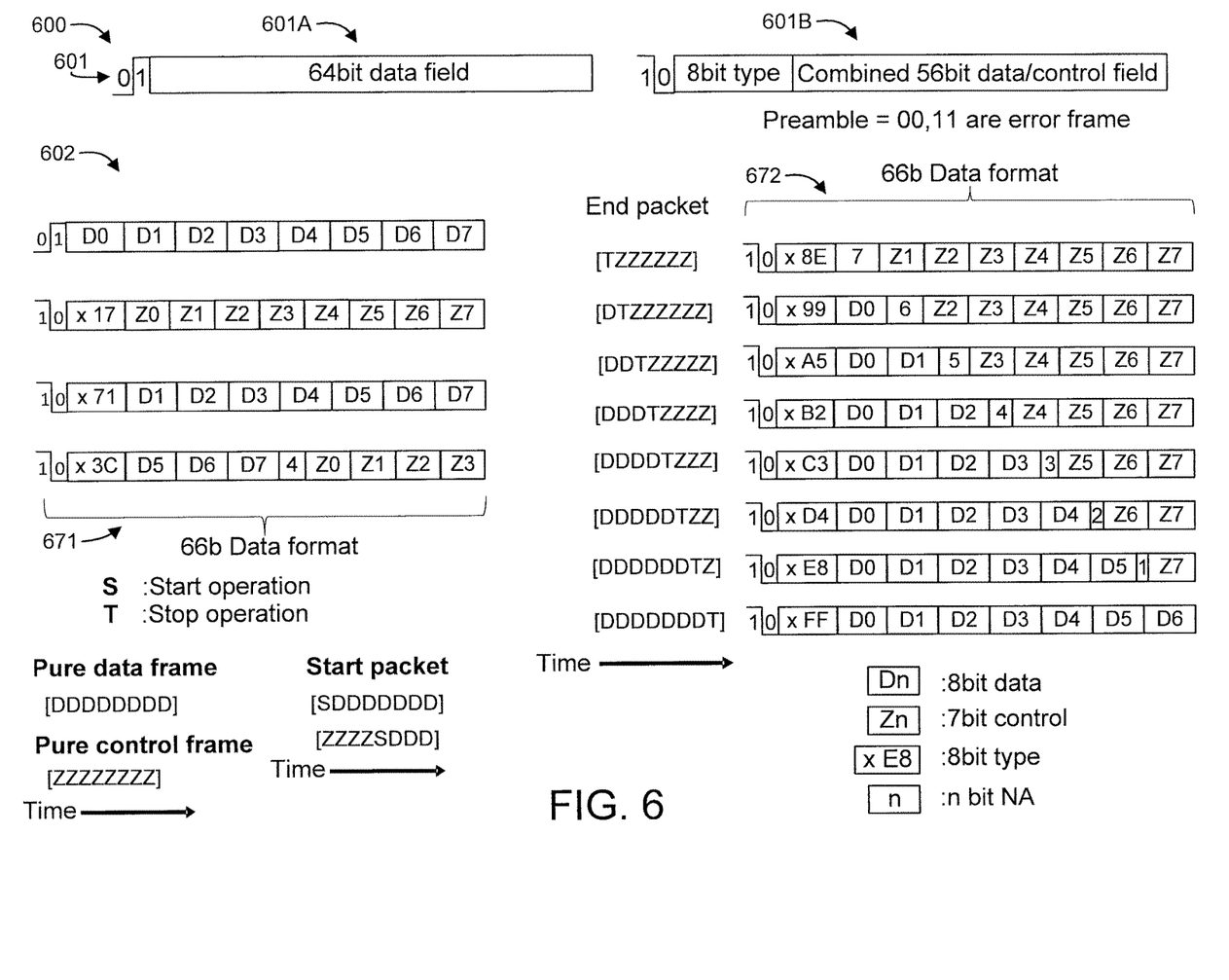
FIG. 6 shows an exemplary CRC insertion for 64b/66b encoding, in accordance with an embodiment of the present principles.

FIG. 6 shows an exemplary CRC insertion 600 for 64b/66b encoding, in accordance with an embodiment of the present principles.

In FIG. 6, a 64b/66b encoding overview 601 and a code definition 602 are shown. Using the code definition 602 in FIG. 6, a data packet is generated from the combination of codes shown therein.

Regarding the overview 601, a 2 bit sync preamble and two types of frames 601A and 601B are shown.

Also shown in FIG. 6 is a pure data frame (i.e., "[DDDDDDDD]"), a pure control frame (i.e., "ZZZZZZZZ"), start packets (i.e., "SDDDDDDD" and "ZZZZSDDD"), end packets (i.e., "TZZZZZZZ", "DTZZZZZZ", "DDTZZZZZ", "DDDTZZZZ", "DDDDTZZZ", "DDDDDTZZ", "DDDDDDTZ", and "DDDDDDDT"), a start operation (i.e., "S"), and a stop operations (i.e., "T"), as well as the 66b data formats 671 and 672 for the two types of frames.

Figure 7:
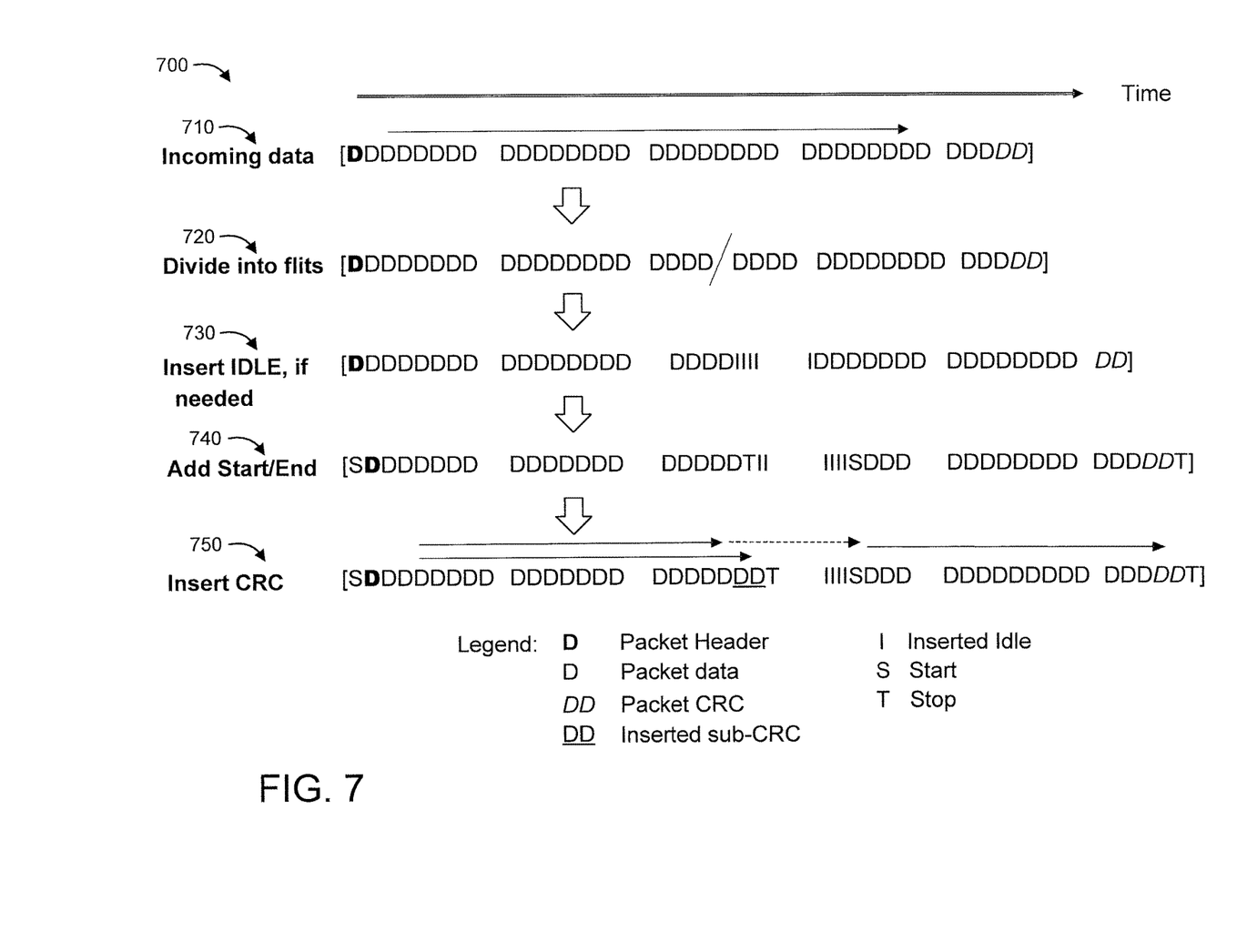
FIG. 7 shows an exemplary sub-CRC insertion, in accordance with an embodiment of the present invention.

FIG. 7 shows an exemplary sub-CRC insertion 700, in accordance with an embodiment of the present invention.

At step 710, receive incoming data.

At step 720, divide the incoming data into flits.

At step 730, insert IDLE patterns, if needed.

At step 740, add start/stop codes.

At step 750, insert the sub-CRC.

The sub-CRC is at the same position as the CRC. The receiver uses nBytes (where "n" is an integer) before "Stop" as the CRC code and continues the calculation for the same incoming data.

Figure 8:
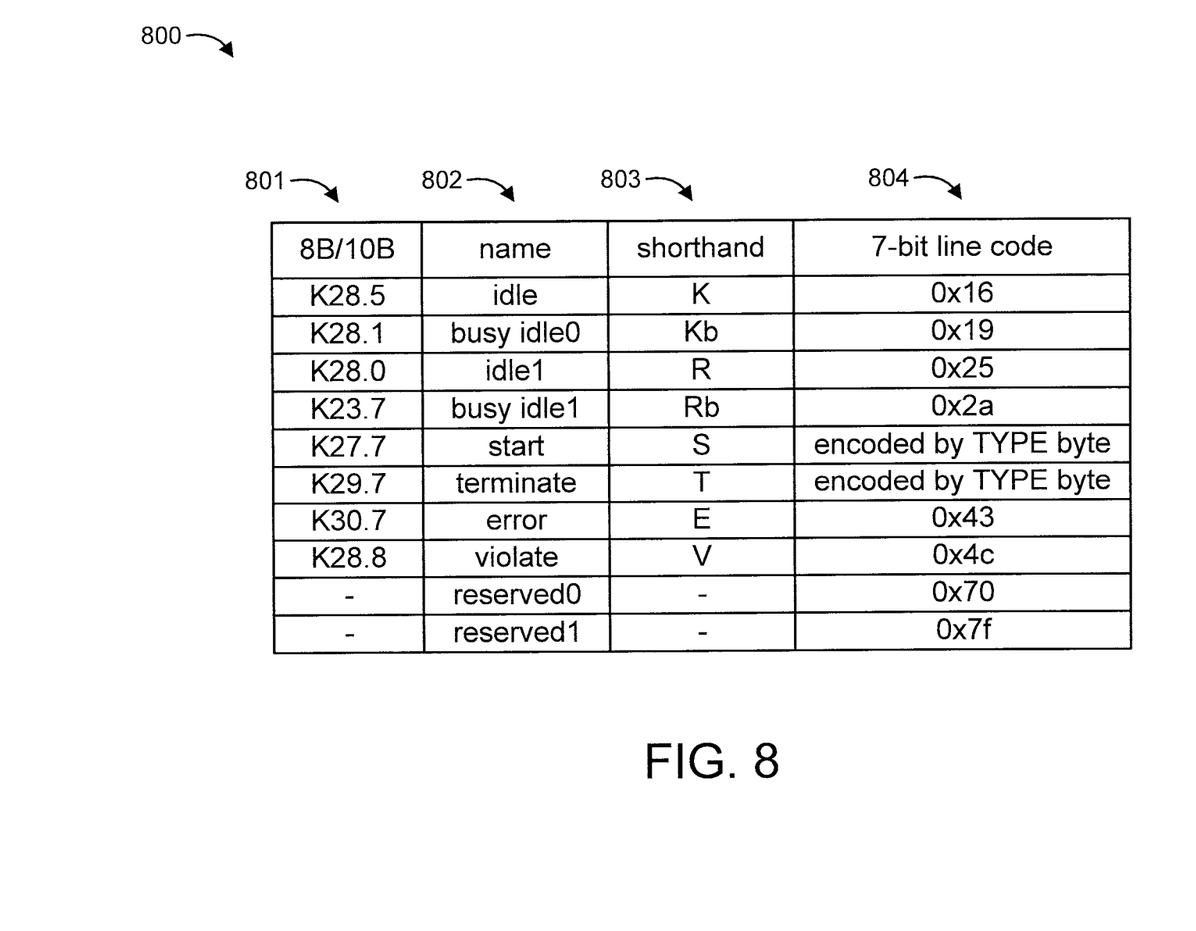
FIG. 8 shows exemplary control code for packet error report and IDLE pattern detection, in accordance with an embodiment of the present invention.

FIG. 8 shows exemplary control code 800 for packet error report and IDLE pattern detection, in accordance with an embodiment of the present invention.

The IDLE and error codes can be used for detecting a flit end and reporting an error to the destination node.

The reporting of the error to the source node uses a back pressure path of the same link as the receiver FIFO control.

The control code 800 includes an 8B/10B column 801, a name column 802, a shorthand column 803, and a 7-bit line code column 804.

Figure 9:
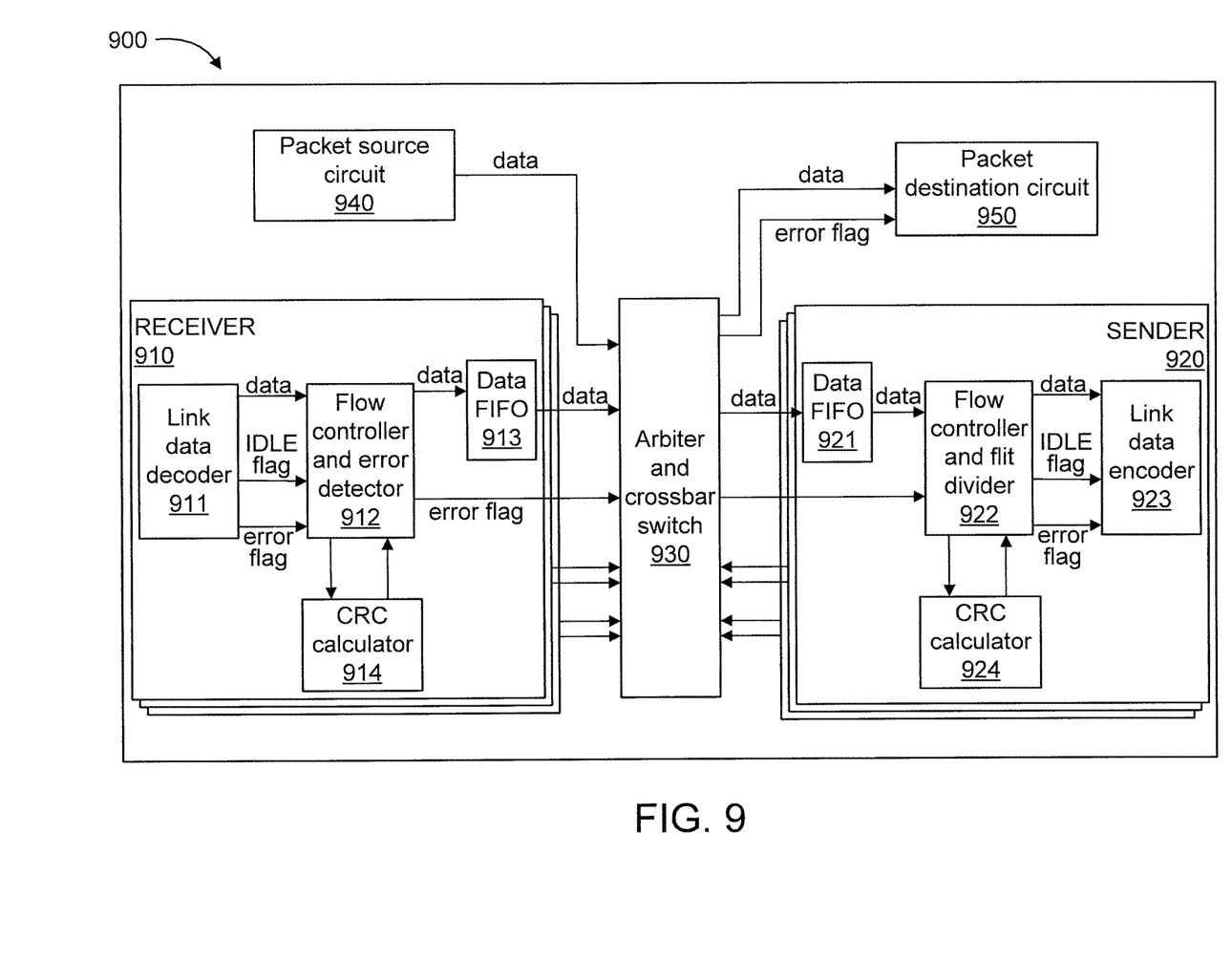
FIG. 9 shows an exemplary network node to which the present invention can be applied, in accordance with an embodiment of the present invention.

FIG. 9 shows an exemplary network node 900 to which the present invention can be applied, in accordance with an embodiment of the present invention. The network node 900 can be, for example, any of a source node, a destination node, and a repeater.

The network node 900 includes a set of receivers 910, a set of senders (interchangeably referred to as "transmitters") 920, an arbiter and crossbar switch 930, a packet source circuit 940, and a packet destination circuit 950.

Each of the receivers 910 includes a link data decoder 911, a flow controller and error detector 912, a data FIFO 913, and a CRC calculator 914.

Each of the senders 920 includes a data FIFO 921, a flow controller and FLIT divider 922, a link data encoder 923, and a CRC calculator 924.

In a receiver 910, the link data decoder 911 provides the following signals to the flow controller and error detector 912: data; IDLE flag; and error flag. The flow controller and error detector 912 provide the following signals to the data FIFO 913: data. The CRC calculator 914 receives signals from the flow controller and error detector 912 and returns a CRC calculation thereto. The data FIFO 913 outputs data to the arbiter and crossbar switch 930, and the flow controller and error detector 912 outputs an error flow, when appropriate, to the arbiter and crossbar switch 930.

In a sender, the data FIFO 921 receives data from the arbiter and crossbar switch 930, and the flow controller and flit divider 922 receives an error flow, when appropriate, from the arbiter and crossbar switch 930. The data FIFO 921 outputs data to the flow controller and flit divider 922. The flow controller and flit divider 922 outputs the following signals to the link data encoder 923: data; IDLE flag; and error flag. The CRC calculator 924 receives signals from the flow controller and flit divider 922 and returns a CRC calculation thereto.

The packet source circuit 940 provides data to the arbiter and crossbar switch 930.

The packet destination circuit 950 receives data and an error flag, when appropriate, from the arbiter and crossbar switch 930.

Each of the receivers 910 is operatively coupled to a respective incoming physical link (not shown), and each of the senders 920 is operatively coupled to a respective physical link (not shown).

Figure 10:
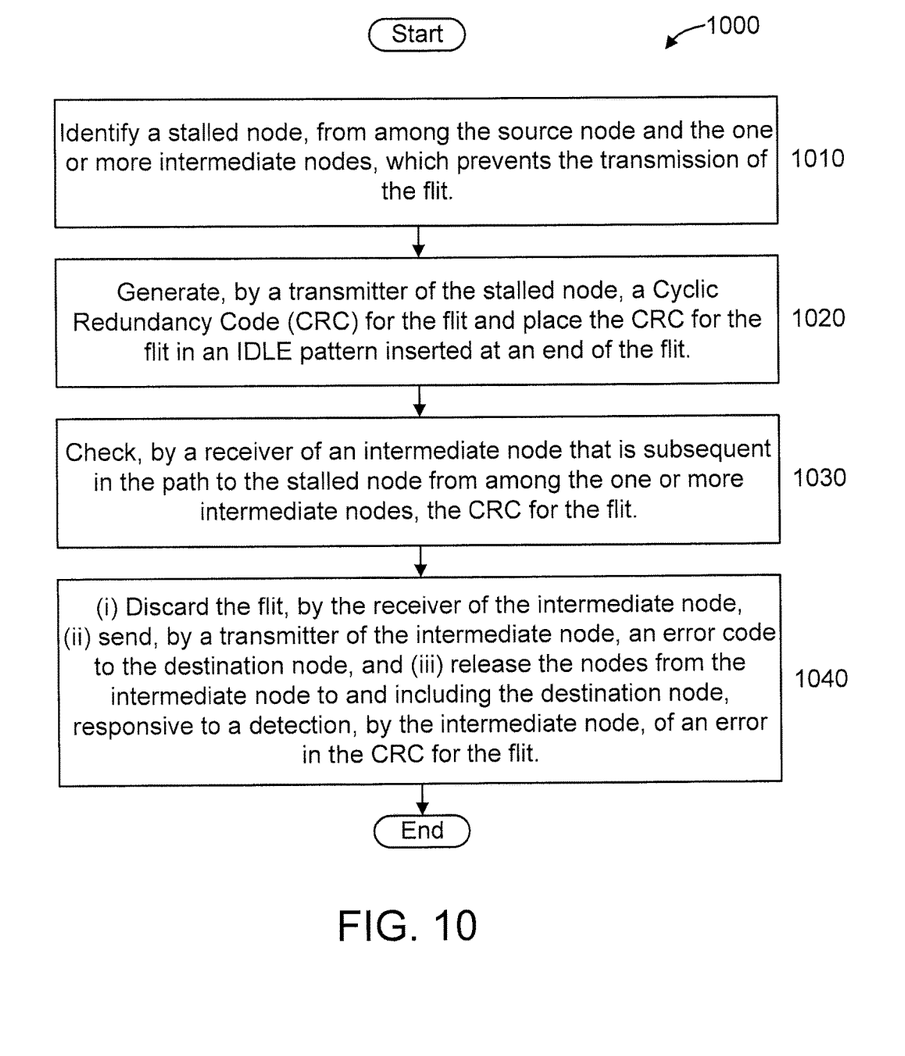
FIG. 10 shows a method for error detection for wormhole routing, in accordance with an embodiment of the present invention.

FIG. 10 shows a method 1000 for error detection for wormhole routing, in accordance with an embodiment of the present invention. In particular, the method 1000 detects packet error during a transmission of a flit of a packet along a path from a source node through one or more intermediate nodes to a destination node. The method 1000 is implemented as part of a wormhole routing process.

At step 1010, identify a stalled node, from among the source node and the one or more intermediate nodes, which prevents the transmission of the flit.

At step 1020, generate, by a transmitter of the stalled node, a Cyclic Redundancy Code (CRC) for the flit and place the CRC for the flit in an IDLE pattern inserted at an end of the flit.

At step 1030, check, by a receiver of an intermediate node that is subsequent in the path to the stalled node from among the one or more intermediate nodes, the CRC for the flit.

At step 1040, (i) discard the flit, by the receiver of the intermediate node, (ii) send, by a transmitter of the intermediate node, an error code to the destination node, and (iii) release the nodes from the intermediate node to and including the destination node, responsive to a detection, by the intermediate node, of an error in the CRC for the flit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A system for detecting packet error during a transmission of a flit of a packet along a path, the system comprising:
 a plurality of nodes that includes a source node, one or more intermediate nodes, and a destination node, the path being from the source node through the one or more intermediate nodes to the destination node,
 wherein each of the plurality of nodes includes a respective receiver and a respective transmitter, configured to:
  identify a stalled node, from among the source node and the one or more intermediate nodes, which prevents the transmission of the flit;
  generate, by the transmitter of the stalled node, a Cyclic Redundancy Code (CRC) for the flit and place the CRC for the flit in an IDLE pattern inserted at an end of the flit;
  check, by the receiver of an intermediate node that is subsequent in the path to the stalled node from among the one or more intermediate nodes, the CRC for the flit; and
  send, by the transmitter of the intermediate node, an error code to the destination node, and release the nodes from the intermediate node to and including the destination node, responsive to a detection, by the intermediate node, of an error in the CRC for the flit.

2. The system of claim 1, wherein the plurality of nodes are further configured to detect the error at a flit-level.

3. The system of claim 1, wherein the one or more intermediate nodes each comprise a respective router.

4. The system of claim 1, wherein the checking of the CRC for the flit is performed by the intermediate node responsive to a detection of a non-data pattern in the flit.

5. The system of claim 4, wherein the non-data pattern is the IDLE pattern that includes the CRC for the flit.

6. The system of claim 1, wherein the CRC placed in the IDLE pattern is a flit-level CRC used in conjunction with a packet-level CRC for an entirety of the packet, the flit-level CRC only being generated and placed in the IDLE pattern responsive to a detection of a stall in the transmission of the flit at the stalled node.

7. The system of claim 1, wherein the IDLE pattern exists prior to the CRC being inserted therein.

8. The system of claim 1, wherein the CRC replaces the IDLE pattern already existing at the end of the flit.

9. The system of claim 1, wherein the CRC supplements the IDLE pattern already existing at the end of the flit.

* * * * *